(12) United States Patent
Wu

(10) Patent No.: US 12,619,645 B2
(45) Date of Patent: *May 5, 2026

(54) PUPIL DYNAMICS ENTROPY AND TASK CONTEXT FOR AUTOMATIC PREDICTION OF CONFIDENCE IN DATA

(71) Applicant: Rockwell Collins, Inc., Cedar Rapids, IA (US)

(72) Inventor: Peggy Wu, Ellicott City, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/983,930

(22) Filed: Dec. 17, 2024

(65) Prior Publication Data

US 2025/0200094 A1 Jun. 19, 2025

Related U.S. Application Data

(60) Provisional application No. 63/612,156, filed on Dec. 19, 2023.

(51) Int. Cl.
*G06F 16/00* (2019.01)
*G06F 3/00* (2006.01)
(Continued)

(52) U.S. Cl.
CPC ............ *G06F 16/335* (2019.01); *G06F 3/013* (2013.01); *G06N 3/08* (2013.01); *G06V 40/103* (2022.01);
(Continued)

(58) Field of Classification Search
CPC ....... G06F 16/335; G06F 3/013; G06V 40/11; G06V 40/28; G06V 40/18; G06V 40/103;
(Continued)

(56) References Cited

U.S. PATENT DOCUMENTS

| | | | | |
|---|---|---|---|---|
| 12,112,649 B2 * | 10/2024 | Johnson | .................... | G08G 5/54 |
| 2014/0111630 A1 * | 4/2014 | R. Pires | ................. | A61B 3/113 |
| | | | | 348/78 |

(Continued)

FOREIGN PATENT DOCUMENTS

| | | | | |
|---|---|---|---|---|
| EP | 3667634 A1 | * | 6/2020 | |
| GB | 2603640 B | * | 11/2022 | |
| WO | WO2019060283 A1 | * | 3/2019 | |

OTHER PUBLICATIONS

Chengjia Yang et al., "Analysis on Eye Movement Indexes Based on Simulated Flight Task ", : EPCE 2014, LNAI 8532,, 2014., Springer International Publishing Switzerland 2014, pp. 419-427.*

*Primary Examiner* — Srirama Channavajjala
(74) *Attorney, Agent, or Firm* — Suiter Swantz IP

(57) ABSTRACT

A pilot monitoring system receives data of a pilot's pose such as arm/hand positions and eyes to detect their gaze and pupil dynamics, coupled with knowledge about their current task to detect what a pilot is paying attention to, and temporally predict what they may do next. The system may use interactions between the pilot and the instrumentation to estimate a probability distribution of the next intention of the pilot. Such probability distribution may be used subsequently to evaluate the performance or training effectiveness and readiness of the pilot. The system determine data that will be necessary for a later pilot action based on the probability distribution, and compile that data from avionics systems for later display.

9 Claims, 3 Drawing Sheets

(51) Int. Cl.

| | |
|---|---|
| *G06F 3/01* | (2006.01) |
| *G06F 16/335* | (2019.01) |
| *G06N 3/00* | (2023.01) |
| *G06N 3/08* | (2023.01) |
| *G06V 40/00* | (2022.01) |
| *G06V 40/10* | (2022.01) |
| *G06V 40/18* | (2022.01) |
| *G06V 40/20* | (2022.01) |

(52) U.S. Cl.
CPC .............. *G06V 40/11* (2022.01); *G06V 40/18* (2022.01); *G06V 40/193* (2022.01); *G06V 40/28* (2022.01)

(58) Field of Classification Search
CPC .... G06V 40/193; G06V 40/20; G06V 20/597; G06V 10/72; G06N 3/08
See application file for complete search history.

(56) References Cited

U.S. PATENT DOCUMENTS

| | | | | |
|---|---|---|---|---|
| 2014/0118225 | A1* | 5/2014 | Jerauld ..................... | A61B 5/11 |
| | | | | 345/8 |
| 2017/0076617 | A1* | 3/2017 | Schupp ................... | G01S 19/03 |
| 2019/0213429 | A1* | 7/2019 | Sicconi .................. | G06F 3/012 |
| 2020/0275873 | A1* | 9/2020 | Xu .......................... | G06V 40/20 |
| 2021/0251541 | A1* | 8/2021 | Weatherhead ....... | A61B 5/4884 |
| 2021/0300384 | A1* | 9/2021 | Marti .................... | B60W 50/14 |
| 2022/0153278 | A1* | 5/2022 | Rosman ................ | G06N 3/045 |
| 2023/0026394 | A1* | 1/2023 | Rock ......................... | G06T 7/11 |
| 2023/0039764 | A1* | 2/2023 | Wu ......................... | G06T 7/246 |
| 2024/0367645 | A1* | 11/2024 | Sasmal ................. | B60W 50/16 |
| 2024/0428551 | A1* | 12/2024 | Piao ....................... | G06V 10/44 |

* cited by examiner

100

108

VISION BASED
SENSOR

112

PROCESSOR

102

DISPLAY

114

106

DATA

MEMORY

104

PUPIL DYNAMICS ENTROPY AND TASK CONTEXT FOR AUTOMATIC PREDICTION OF CONFIDENCE IN DATA

The present application claims the benefit under 35 U.S.C. § 119(e) of U.S. Provisional App. No. 63/612,156 (filed Dec. 19, 2023), which is incorporated herein by reference.

BACKGROUND

Operators utilizing augmented data visualizations may not have the time or cognitive capability to review the raw data that data aggregations and visualizations are designed to represent. In highly complex tasks, this may lead to the operator having a lack in confidence in the visualizations. This can result in time and resources wasted by the operator to verify data sources and calculations that have already been performed, thus taking away time for more mission-relevant tasks.

Consequently, it would be advantageous if an apparatus existed that is suitable for monitoring a pilot's situational awareness and determining a pilot's future intentions.

SUMMARY

In one aspect, embodiments of the inventive concepts disclosed herein are directed to a pilot monitoring system that receives data of a pilot's pose such as arm/hand positions and eyes to detect their gaze and pupil dynamics, coupled with knowledge about their current task to detect what a pilot is paying attention to, and temporally predict what they may do next.

In a further aspect, the system may use interactions between the pilot and the instrumentation to estimate a probability distribution of the next intention of the pilot. Such probability distribution may be used subsequently to evaluate the performance or training effectiveness and readiness of the pilot.

In a further aspect, the system determine data that will be necessary for a later pilot action based on the probability distribution, and compile that data from avionics systems for later display.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
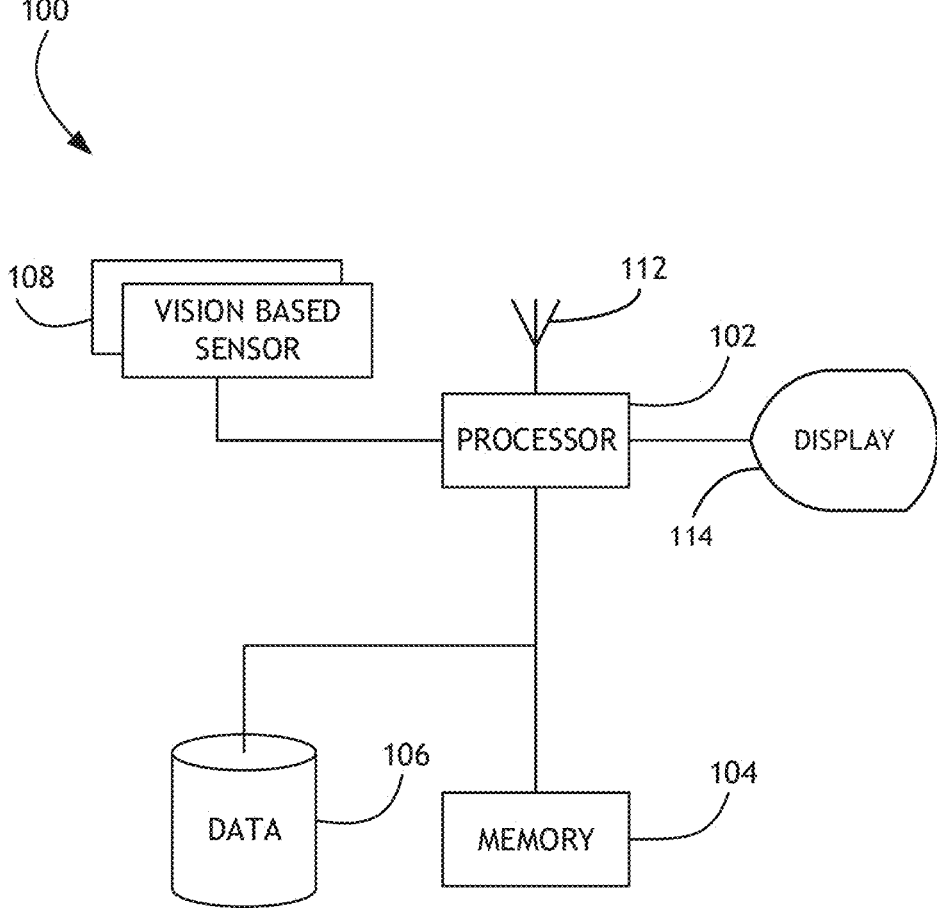
FIG. 1 shows a block diagram of a system suitable for implementing embodiments of the incentive concepts disclosed herein.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a pilot monitoring system that receives data of a pilot's pose such gaze and pupil dynamics. The system may use the pilot's pose to evaluate the pilot's confidence in data being displayed. Where the system determines that pilot confidence is low, the system may retrieve supplemental data to enhance user confidence.

Referring to FIG. 1, a block diagram of a system 100 suitable for implementing embodiments of the incentive concepts disclosed herein is shown. The system 100 includes a processor 102, memory 104 in data communication with the processor 102 for storing processor executable code, and one or more vision based sensors, such as cameras 108, for receiving an image data stream.

In at least one embodiment, the one or more cameras 108 record eye movement/gaze of a pilot, eye lid position, hand/arm position and movement, and other physical data landmarks. The processor executable code configures the processor 102 to continuously log the data from the camera 108 in a data storage element 106. The processor 102 analyzes the camera data to identify gaze and pupil dynamics (e.g., pupil response and changes over time), and physical pose estimate for the pilot.

In at least one embodiment, the camera data are correlated with specific stimuli such as information being displayed, instrument readings, alerts, or the like. The processor 102 determines a user confidence metric based on the camera data and correlated flight task/stimuli. In high tempo scenarios, an autonomous system that is aware of operator confidence can provide supplemental data to the operator in order to address any concerns about data sources and data credibility. The present disclosure describes a method to use pupil dynamics, combined with a dynamic model of the task that the operator is performing, to evaluate whether the operator is exhibiting behaviors that represent low confidence in the data. A learning mechanism first identifies the nominal baseline behavior of operators for the task. An ongoing monitoring system continuously examines the pupil behavior of the operator to detect anomalous behavior representative of operator confusion or skepticism. A confidence level of the data is then presented.

In at least one embodiment, when the processor 102 determines that use confidence is below a predetermined threshold, the processor 102 may retrieve supplemental data from the data storage element 106. Such supplemental data may include metadata pertaining to the source of the displayed data.

Figure 2:
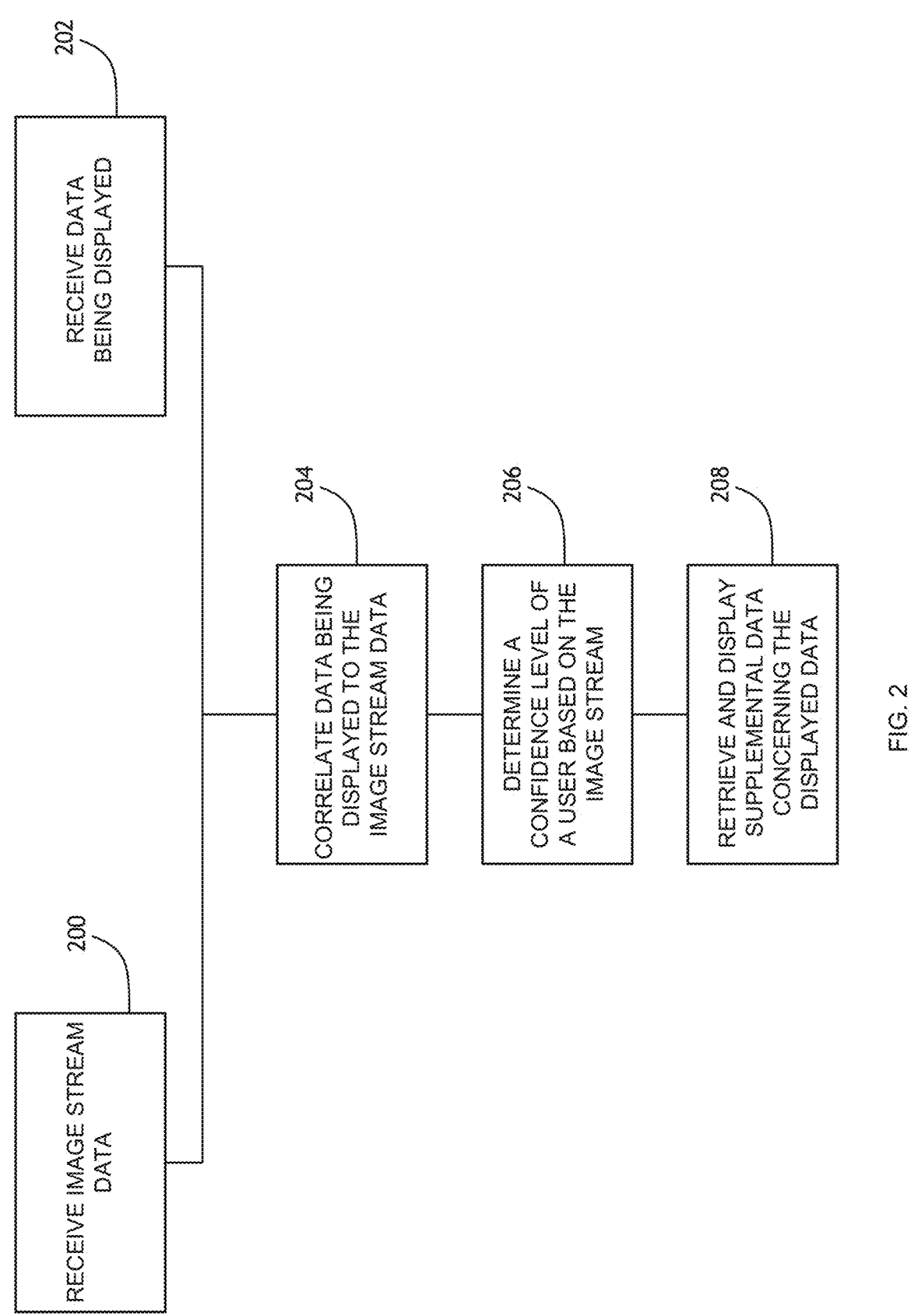
FIG. 2 shows a flowchart of an exemplary embodiment of the inventive concepts disclosed herein.

Referring to FIG. 2, a flowchart of an exemplary embodiment of the inventive concepts disclosed herein is shown. A computer system implementing embodiments of the inventive concepts disclosed herein receives 200 an image stream corresponding to one or more vision-based sensors. The image stream is processed for eye tracking data (including pupil dynamics and eyelid position) and to determine physiological landmarks such as hands and arms to generate a pose estimate for the pilot. Such data is continuously logged.

The computer system also receives data 202 being displayed to the user. The computer system then correlates 204 the displayed data to the image stream data.

The computer system determines 206 a confidence level of the user in the data being displayed based on the image stream data. In at least one embodiment, the computer system may perform some initial calibration to determine a user baseline response to neutral data and then compare the subsequent image stream to the baseline.

The confidence level may be based on a determination of confusion, skepticism, or the like. Where the computer system determines that the user confidence is below a predetermined threshold, the computer system may retrieve 208 additional supplemental information pertaining to the displayed data. For example, the computer system may identify a source for the data being displayed and provide the source to the user to address the user's low confidence.

Figure 3:
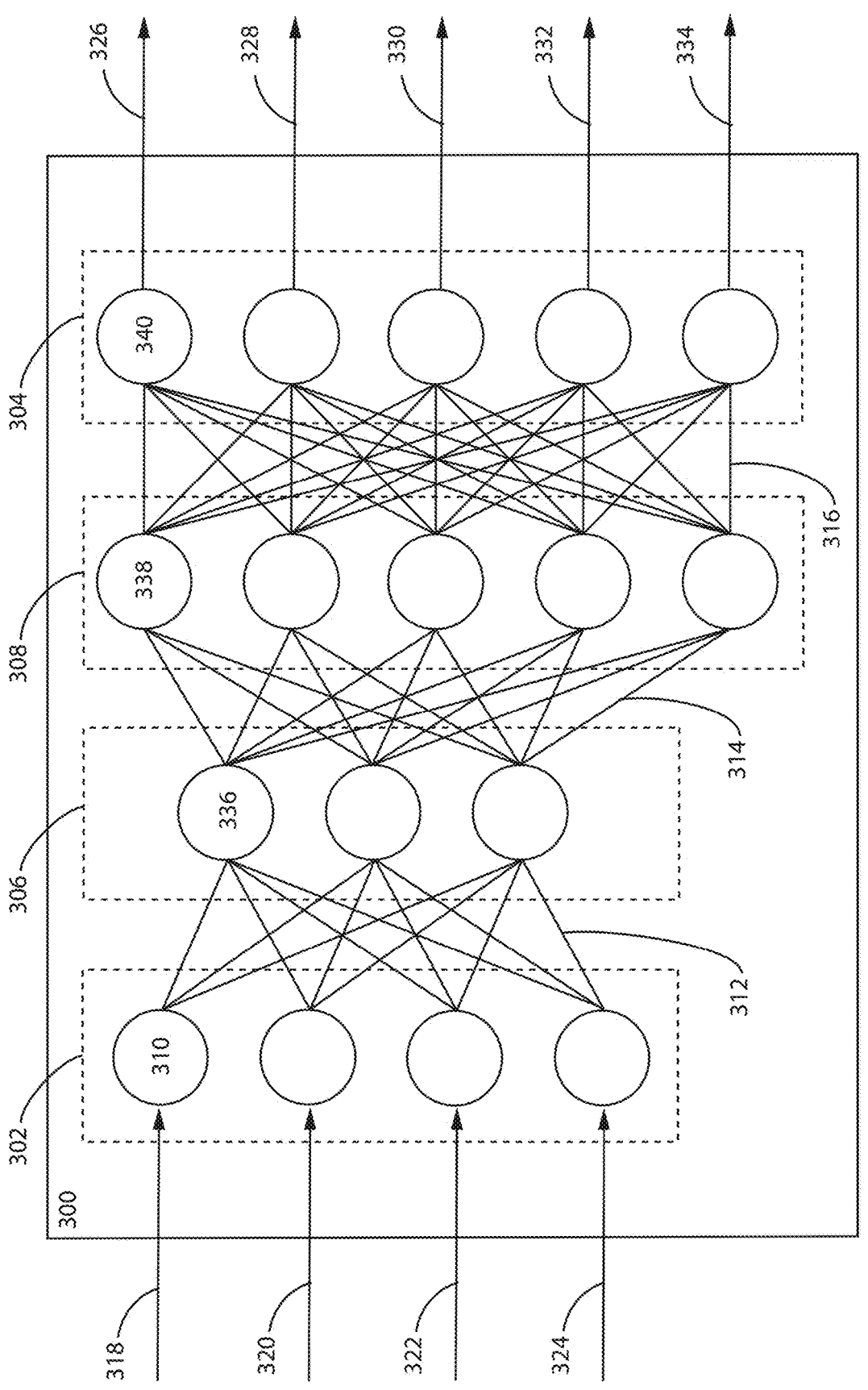
FIG. 3 shows a block diagram of a neural network according an exemplary embodiment of the inventive concepts disclosed herein.

Referring to FIG. 3, a block diagram of a neural network according an exemplary embodiment of the inventive concepts disclosed herein is shown. The neural network 300 comprises an input layer 302 that receives external inputs (including physiological signals, such as electroencephalograph (EEG) and functional near-infrared spectroscopy (fNIRs), camera data, and potentially user or task specific profiles), and output layer 304, and a plurality of internal layers 306, 308. Each layer comprises a plurality of neurons or nodes 310, 336, 338, 340. In the input layer 302, each node 310 receives one or more inputs 318, 320, 322, 324 corresponding to a digital signal and produces an output 312 based on an activation function unique to each node 310 in the input layer 302. An activation function may be a Hyperbolic tangent function, a linear output function, and/or a logistic function, or some combination thereof, and different nodes 310, 336, 338, 340 may utilize different types of activation functions. In at least one embodiment, such activation function comprises the sum of each input multiplied by a synaptic weight. The output 312 may comprise a real value with a defined range or a Boolean value if the activation function surpasses a defined threshold. Such ranges and thresholds may be defined during a training process. Furthermore, the synaptic weights are determined during the training process.

Outputs 312 from each of the nodes 310 in the input layer 302 are passed to each node 336 in a first intermediate layer 306. The process continues through any number of intermediate layers 306, 308 with each intermediate layer node 336, 338 having a unique set of synaptic weights corresponding to each input 312, 314 from the previous intermediate layer 306, 308. It is envisioned that certain intermediate layer nodes 336, 338 may produce a real value with a range while other intermediated layer nodes 336, 338 may produce a Boolean value. Furthermore, it is envisioned that certain intermediate layer nodes 336, 338 may utilize a weighted input summation methodology while others utilize a weighted input product methodology. It is further envisioned that synaptic weight may correspond to bit shifting of the corresponding inputs 312, 314, 316.

An output layer 304 including one or more output nodes 340 receives the outputs 316 from each of the nodes 338 in the previous intermediate layer 308. Each output node 340 produces a final output 326, 328, 330, 332, 334 via processing the previous layer inputs 316, the final output 326, 328, 330, 332, 334 corresponding to a determination of user confidence in what the user is seeing. Such outputs may comprise separate components of an interleaved input signal, bits for delivery to a register, or other digital output based on an input signal and DSP algorithm.

In at least one embodiment, each node 310, 336, 338, 340 in any layer 302, 306, 308, 304 may include a node weight to boost the output value of that node 310, 336, 338, 340 independent of the weighting applied to the output of that node 310, 336, 338, 340 in subsequent layers 304, 306, 308. It may be appreciated that certain synaptic weights may be zero to effectively isolate a node 310, 336, 338, 340 from an input 312, 314, 316, from one or more nodes 310, 336, 338 in a previous layer, or an initial input 318, 320, 322, 324.

In at least one embodiment, the number of processing layers 302, 304, 306, 308 may be constrained at a design phase based on a desired data throughput rate. Furthermore, multiple processors and multiple processing threads may facilitate simultaneous calculations of nodes 310, 336, 338, 340 within each processing layers 302, 304, 306, 308.

Layers 302, 304, 306, 308 may be organized in a feed forward architecture where nodes 310, 336, 338, 340 only receive inputs from the previous layer 302, 304, 306 and deliver outputs only to the immediately subsequent layer 304, 306, 308, or a recurrent architecture, or some combination thereof.

Embodiments of the present disclosure enable the ability to detect operator confidence in data in any system that provides feedback to the operator. Such a capability can be used to improve user experience, increase operator trust of the system, and reduce the cognitive workload of the operator. This capability enables operators to have confidence in the data they are acting on in order to focus on the decision making tasks that cannot be done by an autonomous system and achieve desired mission outcomes.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:

at least one camera; and at least one processor in data communication with a memory storing processor executable code; and wherein the processor executable code configures the at least one processor to instantiate a trained neural network to:

perform an initial calibration to determine a baseline behavior of the pilot for a task;

receive an image stream from the at least one camera;

receive data being displayed to a pilot;

process the image stream to identify eye tracking data including pupil dynamics and eyelid position;

determine a pilot pose estimate based on the eye tracking data including pupil dynamics identified in the image stream;

correlate the pilot pose estimate to the data being displayed, the data being displayed comprising instrument readings and alerts associated with the task;

compare the baseline behavior to subsequent pupil behavior to detect anomalous behavior representative of pilot skepticism with respect to the displayed data;

determine a pilot confidence level based on the pilot pose estimate and the anomalous behavior; and when the pilot confidence level is below a predetermined threshold, retrieve supplemental data comprising a source for the data and metadata of the corresponding source, pertaining to the displayed data, and displaying the supplemental data to the pilot.

2. The computer apparatus of claim 1, wherein the pose estimate comprises at least a pilot eye movement, a pilot gaze, a pilot eye lid position, a pilot hand and arm position, and a pilot hand and arm movement.

3. The computer apparatus of claim 1, wherein behavior representative of pilot skepticism comprises dwell time and characteristic eye lid position.

4. A method for monitoring pilot behavior via a trained neural network, the method comprising:

performing an initial calibration to determine a baseline behavior of the pilot for a task;

receiving an image stream from at least one camera;

receiving data being displayed to a pilot;

processing the image stream to identify eye tracking data including pupil dynamics and eyelid position;

determining a pilot pose estimate based on the eye tracking data including pupil dynamics identified in the image stream;

correlating the pilot pose estimate to the data being displayed, the data being displayed comprising instrument readings and alerts associated with the task;

comparing the baseline behavior to subsequent pupil behavior to detect anomalous behavior representative of pilot skepticism with respect to the displayed data;

determining a pilot confidence level based on the pilot pose estimate and the anomalous behavior; and when the pilot confidence level is below a predetermined threshold, retrieving supplemental data comprising a source for the data and metadata of the corresponding source, pertaining to the displayed data and displaying the supplemental data to the pilot.

5. The method of claim 4, wherein the pose estimate comprises at least a pilot eye movement, a pilot gaze, a pilot eye lid position, a pilot hand and arm position, and a pilot hand and arm movement.

6. The method of claim 4, wherein behavior representative of pilot skepticism comprises dwell time and characteristic eye lid position.

7. A pilot monitoring system comprising:

at least one camera; and at least one processor in data communication with a memory storing processor executable code; and wherein the processor executable code configures the at least one processor to instantiate a trained neural network to:

perform an initial calibration to determine a baseline behavior of the pilot for a task;

receive an image stream from the at least one camera;

receive data being displayed to a pilot;

process the image stream to identify eye tracking data including pupil dynamics and eyelid position;

determine a pilot pose estimate based on the eye tracking data including pupil dynamics identified in the image stream;

correlate the pilot pose estimate to the data being displayed, the data being displayed comprising instrument readings and alerts associated with the task;

compare the baseline behavior to subsequent pupil behavior to detect anomalous behavior representative of pilot skepticism with respect to the displayed data;

determine a pilot confidence level based on the pilot pose estimate and the anomalous behavior; and when the pilot confidence level is below a predetermined threshold, retrieve supplemental data comprising a source for the data and metadata of the corresponding source, pertaining to the displayed data, and displaying the supplemental data to the pilot.

8. The pilot monitoring system of claim 7, wherein the pose estimate comprises at least a pilot eye movement, a pilot gaze, a pilot eye lid position, a pilot hand and arm position, and a pilot hand and arm movement.

9. The pilot monitoring system of claim 7, wherein behavior representative of pilot skepticism comprises dwell time and characteristic eye lid position.

* * * * *